(12) United States Patent
Donovan et al.

(10) Patent No.: US 11,356,497 B2
(45) Date of Patent: Jun. 7, 2022

(54) FLUID DISPENSING CONTROL UNIT AND FLUID DISPENSING SYSTEM CENTRAL WEB SERVER SOFTWARE INSTALLATION

(71) Applicant: Lincoln Industrial Corporation, St. Louis, MO (US)

(72) Inventors: Nathan Donovan, Columbia, IL (US); Eric Krassinger, St. Louis, MO (US); Mark Linneman, St. Louis, MO (US)

(73) Assignee: LINCOLN INDUSTRIAL CORPORATION, Saint Louis, MO (US)

( * ) Notice: Subject to any disclaimer, the term of this patent is extended or adjusted under 35 U.S.C. 154(b) by 358 days.

(21) Appl. No.: 15/692,697

(22) Filed: Aug. 31, 2017

(65) Prior Publication Data
US 2018/0063223 A1 Mar. 1, 2018

Related U.S. Application Data

(60) Provisional application No. 62/382,430, filed on Sep. 1, 2016.

(51) Int. Cl.
| | | |
|---|---|---|
| H04L 29/08 | (2006.01) |
| H04L 67/025 | (2022.01) |
| B67D 7/30 | (2010.01) |
| H04W 24/04 | (2009.01) |
| G06F 8/61 | (2018.01) |

(52) U.S. Cl.
CPC ............ *H04L 67/025* (2013.01); *B67D 7/303* (2013.01); *G06F 8/61* (2013.01); *H04W 24/04* (2013.01)

(58) Field of Classification Search
CPC ......... B67D 7/303; G06F 8/61; H04L 67/025; H04W 24/04; G11C 2029/5006; G11C 29/56; G11C 29/56004
See application file for complete search history.

(56) References Cited

U.S. PATENT DOCUMENTS 8,346,678 B1 * 1/2013 Markarian ......... G06Q 30/0601
705/346
9,630,197 B1 * 4/2017 Greenberg ............ B05B 12/122
2007/0271194 A1 * 11/2007 Walker ................. G06Q 50/188
705/80

(Continued)

FOREIGN PATENT DOCUMENTS

ES 2579105 A1 * 8/2016 ........... B67D 1/1245

*Primary Examiner* — Vishal Pancholi
*Assistant Examiner* — Bob Zadeh
(74) *Attorney, Agent, or Firm* — Stinson LLP (57) ABSTRACT

A fluid dispensing control unit is provided that includes at least one electronic circuitry processor configured to function as a web server, at least one generic purpose input/output block for connecting to a fluid dispensing system device being a fluid valve, a meter, a pump or a tank for controlling or metering the dispensed fluid or for controlling the fluid pump or tank. The fluid dispensing control unit further includes at least one web input/output block that is provided for connecting the web server to a web enabling a remote control of the fluid dispensing control unit and the connected fluid dispensing system device via the web. The at least one generic purpose input/output block and the one web input/output block are connected with the at least one electronic circuitry processor.

20 Claims, 5 Drawing Sheets

(56) References Cited

U.S. PATENT DOCUMENTS

| | | | |
|---|---|---|---|
| 2008/0041942 A1* | 2/2008 | Aissa | G06Q 20/341 |
| | | | 235/382 |
| 2008/0222991 A1 | 9/2008 | Wood | |
| 2009/0030719 A1* | 1/2009 | Nadas | G06Q 10/087 |
| | | | 705/2 |
| 2012/0143560 A1* | 6/2012 | Tabet | B60K 15/03 |
| | | | 702/140 |
| 2012/0278454 A1* | 11/2012 | Stewart | H04L 67/34 |
| | | | 709/220 |
| 2015/0344284 A1* | 12/2015 | Perkins | B67D 1/0037 |
| | | | 222/1 |
| 2016/0051751 A1* | 2/2016 | Silkaitis | G06Q 50/00 |
| | | | 604/151 |
| 2018/0063223 A1* | 3/2018 | Donovan | H04L 67/025 |

\* cited by examiner

FLUID DISPENSING CONTROL UNIT AND FLUID DISPENSING SYSTEM CENTRAL WEB SERVER SOFTWARE INSTALLATION

BACKGROUND OF THE INVENTION

As automotive dealership management systems are more and more sophisticated, these systems interface with other systems in the automotive dealership. For example, the parts management and acquisition system interfaces with the automotive dealership management system. In addition, the various fluid delivery systems used within the automotive dealership interface with the management system. The integration degree of these systems is increasing, but still requiring easier implementation and installation, so that the full operation and management of the automotive dealership can be accomplished even more seamlessly and without undue effort.

Most automotive businesses which are involved in sales and/or service use a computer-based system to manage inventory and repair orders. Such systems, frequently referred to as dealership management systems or DMS, vary in size and complexity depending on the size and needs of the particular automotive business. In addition, a DMS interfaces with other systems at various levels. For example, a DMS may receive or provide certain information to other systems such as a fluid dispensing system, a parts management system and/or a repair order scheduling system.

In addition, there is a need for a fluid dispensing system which is easy to install and implement and which is simple in use so that the various operators of the system can take full advantage of the system without the need for overrides or unnecessary effort. There are many reasons to integrate the fluid management system of a service shop into the shop's DMS accounting software. Some of these reasons are: automate billing process, dispense only valid repair orders, manage lubricant inventory, increase service bay efficiency, and prevent misallocation of product. Benefiting owners, service managers, parts managers and mechanics, an integrated fluid control system saves time and money through automated billing and by creating a smooth flow throughout the operation of the shop. Ease of installation and management of the fluid control system including customizing its installation and location of its various parts allows mechanics controlled access to lubricants or other fluids without leaving their bays. Dispensing events are captured instantly and automatically to eliminate manual entering and errors. Accounting functions are completed accurately on the repair order and invoice, recording inventory depletion and eliminating lost billings.

SUMMARY OF THE INVENTION

Fluid dispensing control unit according to one embodiment of the invention includes at least one electronic circuitry processor which is at least in parts configured to function as a web server, at least one generic purpose input/output block for connecting to a fluid dispensing system device being a fluid valve, meter, pump or tank for controlling or metering the dispensed fluid or for controlling the fluid pump or tank, at least one web input/output block for connecting the web server to a web enabling a remote control of the fluid dispensing control unit and the connected fluid dispensing system device via the web, and whereby the at least one generic purpose input/output block and the one web input/output block are connected with the at least one electronic circuitry processor.

According to another embodiment of the invention a fluid dispensing system central web server software installation enables to connect the central web server via the web with at least one fluid dispensing control unit and enables the connection of a computer to the web to control and monitor the connected fluid dispensing system device via the fluid dispensing control unit via the central web server without having any specific software installed on the computer aside a web browser accessing the software installation on the central web server.

Following features constitute significant user interface improvements that make the system simpler and easier to use. This reduces installation and maintenance time and therewith the overall cost of using the system, and allows the system data collection to be more accurate by improving the reliability of the system.

An LCD touchscreen interface on the fluid dispensing control unit allows for dynamic user interface. Further it allows for unlimited and unrestricted configuration of the fluid dispensing control unit, and real time updates of system status at the installation site.

One embedded web server on the fluid dispensing control unit allows for configuration and status checking of the fluid dispensing control unit remotely from PC workstation.

Further embedded web servers on the fluid dispensing control unit allow for individual monitoring of each dispense point. A dispense point being a point of control for dispensing and measuring volume of oil. The software installation provides a graphical user interface for this feature to assist the user in precise dosing.

An automatic over-ride function on the fluid dispensing control unit allows user to configure system to continue running in the event of network connectivity loss, and for full accounting of fluid dispensed during the network outage.

Following features integrate control of other applications that are related to the primary function of typical fluid control systems into the fluid control system. While fluid tank monitoring systems are available, they are currently sold as separate systems in the market today. The system according to the invention establishes an oil bar system for tracking dispenses enabling a monitoring with very high degree of control.

The oil bar feature establishes the ability to interleave dispensing transactions on a single control point to accommodate an oil bar application. This allows multiple users to use the same dispense point for separate dispenses that need to take place in intermingled discreet steps.

Analog input circuitry on hardware component allow for monitoring of fluid levels in storage tanks.

Following features are networking and information technology features that significantly improve network security and reduce information technology related work by allowing the system to be integrated into existing company networks and physical infrastructure.

Web based software allows for a single installation of software that can then be accessed by all users. This improves over software applications that must be installed on every computer needing access to the control system or reporting functionality.

Web based software allows for centralized management of a number of individual sites from one installation, and the system allows a maximum of 50 hardware components per site. This allows for centralized control, monitoring and data collection of up to above 1000 hardware units per software installation regardless of geographic location.

Web based software allows for individual sites to be subdivided into smaller logical units with different configuration options and use cases despite being located on in the same physical area and same network subnet.

Dynamic Host Control Protocol (DHCP) on the system hardware components allows for system to seamlessly integrate with enterprise level networks by automatically conforming to their existing network internet protocol scheme configuration. This constitutes an important security issue.

Thus the system allows for centralized control, monitoring and data collection of mechanical pumps, valves and sensors that dispense fluids in controlled volumes. The system keeps track of all fluid volumes dispensed, and limits dispensing volumes to approved amounts. Ethernet connectivity on hardware components allows conforming to existing PC network at job site instead of requiring creation of separate network. This reduces required network infrastructure. The software allows for multilingual user interface. The primary language can be changed to English, French or Spanish. This option can be customized for each user, allowing the software to change the user interface language for people who are not native speakers of the primary language. This option is keyed off of their personal log in information. Last but not least the system interfaces with enterprise resource planning software that allows volume based billing.

DETAILED DESCRIPTION OF THE INVENTION

Figure 1:
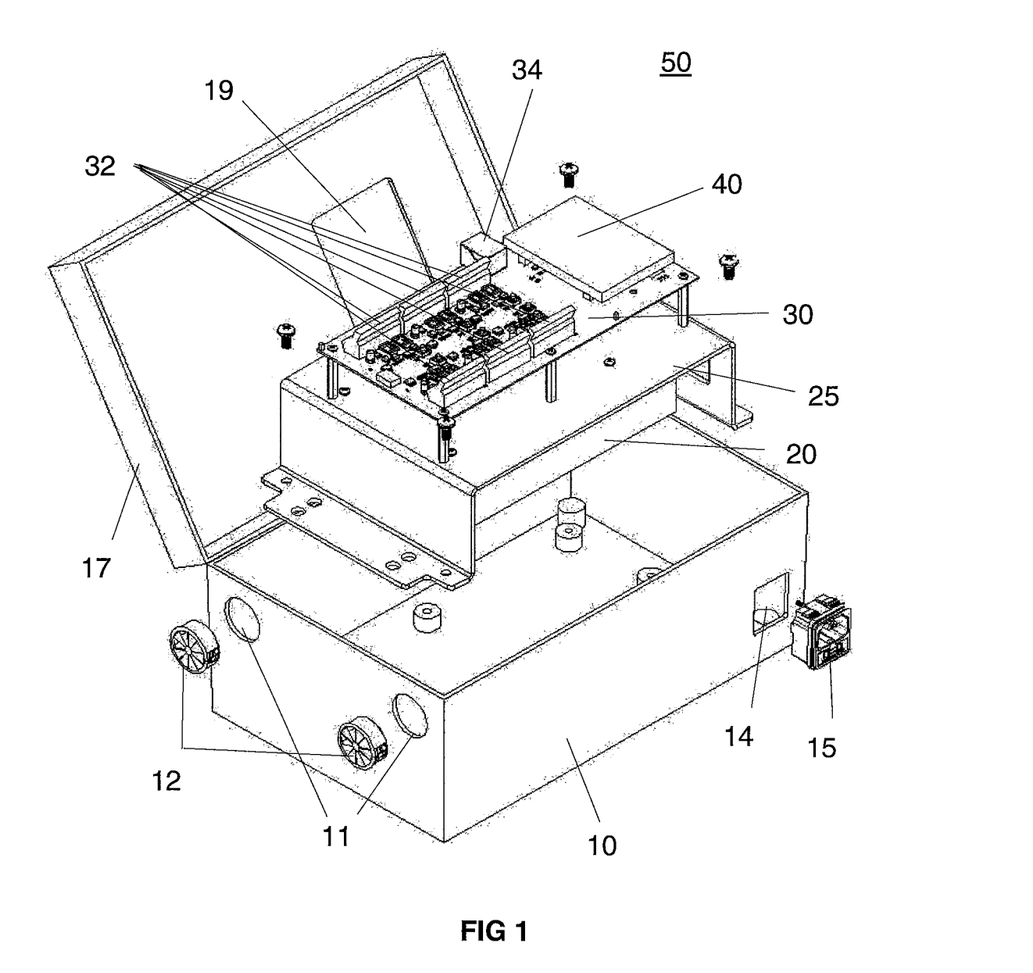
FIG. 1 shows an exploded perspective view of a fluid dispensing control unit according to the present invention.

FIG. 1 shows a fluid dispensing control unit 50 in a kind of an explosion drawing in a perspective view. The fluid dispensing control unit 50 has an enclosure includes at least two matching parts configured to be openable and closeable. The enclosure has a lower shell 10 (a first matching part) and upper shell 17 (a second matching part), which are connected via hinge, so that the upper shell 17 can be opened to access e.g. an LCD touch screen 40 for touch control. The enclosure is made of a plastic material. Of course in other embodiments the enclosure can be of any other design having more parts, different form and/or different material. The enclosure is surrounding the inner parts of the fluid dispensing control unit 50 being the power supply 20, the mounting bracket 25, the printed circuit board 30 and the LCD touch screen 40. The upper shell 17 of the enclosure has a window 19, so that the LCD touch screen 40 is visible also when the enclosure is closed. The side wall of the lower shell 10 of the enclosure has an opening 14 for an electrical power entering module 15 to enable connecting to an external electricity network.

The bottom wall of the lower shell 10 of the enclosure has another two openings 11 to pass through cables to connect other devices of a fluid dispensing system with general purpose input output ports 32 on the printed circuit board 30. Further also an Ethernet connection port 34 is located on the printed circuit board 30, to connect the fluid dispensing control unit 50 e.g. to a web via cable or in other embodiments also wireless. In case that at least one of these openings 11 is not in use for cables passing through, it can be closed with a corresponding plug 12.

Figure 2:
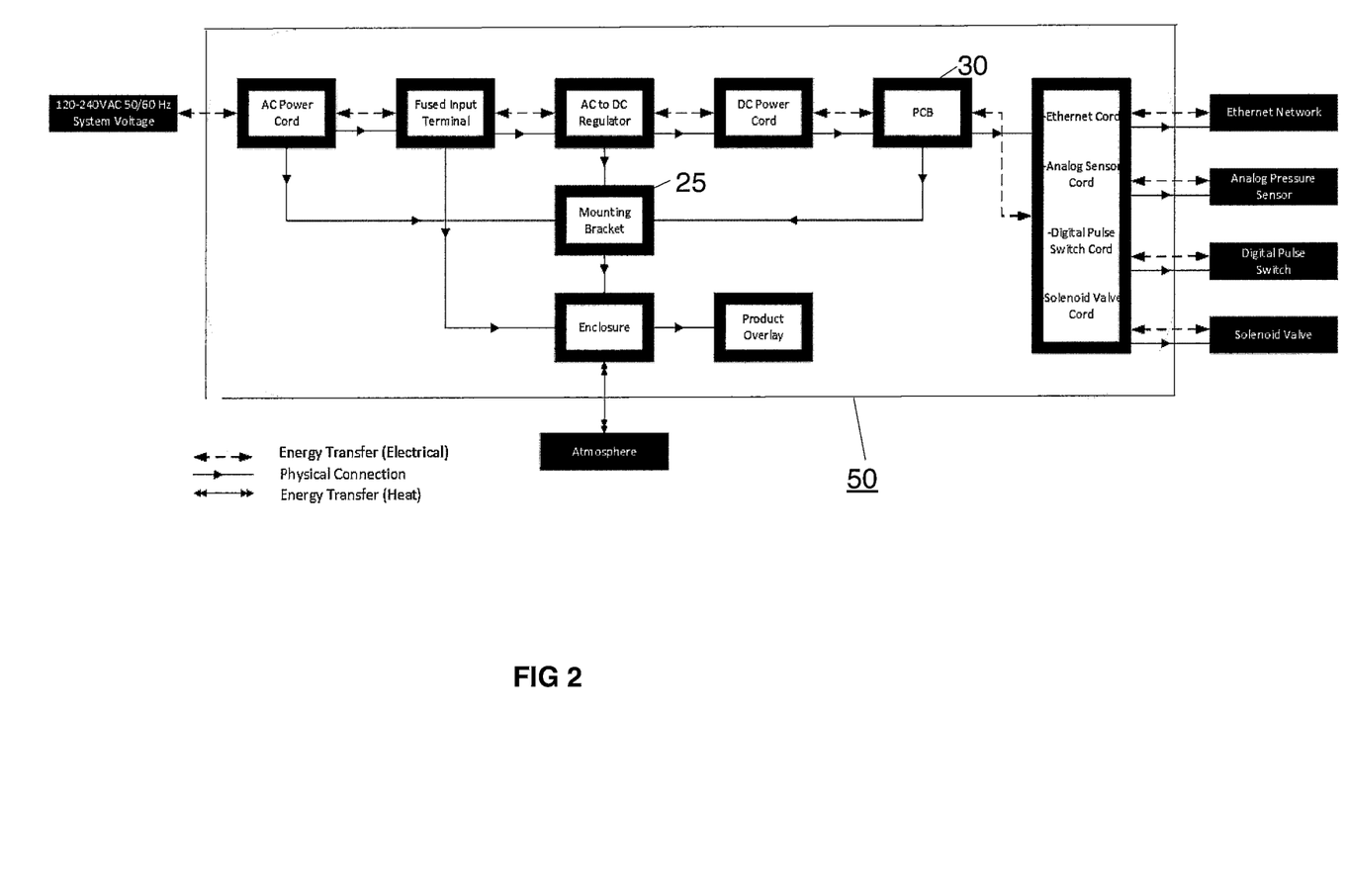
FIG. 2 shows a block diagram of the fluid dispensing control unit for further explanation of the components of the fluid dispensing control unit.

FIG. 2 shows a block diagram of the fluid dispensing control unit 50 of FIG. 1 for further explanation of the components of the fluid dispensing control unit 50 particularly their physical connections and interactions regarding energy transfer both electrical and heat-wise. An AC power cord is provided to pass on electrical power coming from an external electricity 120-240 V AC 50/60 Hz network, whereby the electrical power enters the fluid dispensing control unit 50 via its power entering module 15. The AC power cord is then physically and electrically connected with a fused input terminal, which is physically and electrically connected to an AC to DC regulator. Thereby the AC to DC regulator accepts a voltage range of 85 V AC to 265 V AC at a maximum load of 4.5 Amps, and converts that to 24 V DC with a maximum load of 10 Amps.

The DC side of the AC to DC regulator is physically and electrically connected to a DC power cord, which is physically and electrically connected with the printed circuit board 30. The printed circuit board 30 is provided with a processor e.g. an ARM M4 processor. It uses an Ethernet PHY layer to communicate with a network via the Ethernet connection port 34 and ultimately derives configuration and system use parameters via this connection. The processor also uses I2C communication busses to drive communication with an Electrically Erasable Programmable Read Only Memory (EEPROM) and LCD touch screen controller peripherals, being connected to the printed circuit board 30. The EEPROM is used to store sensitive data that must be retained through power cycles. The LCD touch screen controller is used to interpret signals resulting from physical touches on the LCD touch screen 40. Thereby the processor is at least in parts configured to function as a web server for the fluid dispensing control unit 50 in total and is further configured with further six web server functionalities for each of the six ports 32, so that every device of the fluid dispensing system being connected to one of these ports 32 and the fluid dispensing control unit 50 as such can be separately visualized, monitored and controlled in a web arrangement.

The processor uses the I2C communication busses also to drive communication with Analog to Digital Converters (ADC) of the ports 32. The ADC is used to convert analog signals into digital numbers for the purpose of quantifying analog sensors that indicate conditions of the fluid dispensing system. Specifically inputs are used to read pressure sensors that will indicate the level of fluid inside fluid storage tanks. The processor directly controls six 24 V DC 1.85 Amp output drivers, and six 24 V DC 0.15 Amp digital inputs correlated to the general purpose input output ports 32. The output drivers are used to control the operation of fluid control valves that operate the fluid dispensing system. The digital inputs are used to take signals from sensors and metering devices in the fluid dispensing system that measure volume displacement. The output drivers and digital inputs both have Light Emitting Diode (LED) indicators to communicate when the circuitry is active.

Via the general purpose input output ports 32 and the Ethernet connection port 34 the fluid dispensing control unit 50 can be connected to further devices of the fluid dispensing system and a web e.g. the World Wide Web or internal intranet network. Thereby it can be connected via an Ethernet cord to an Ethernet network, via an analog pressure cord to an analog pressure sensor, via a digital pulse switch cord to a digital pulse switch and via a solenoid valve cord to a solenoid valve.

The AC power cord, the AC to DC regulator and the printed circuit board 30 are physically connected to the mounting bracket 25, which is physically connected to the enclosure, to which also the fused input terminal is physically connected. Then of course the enclosure is transferring heat being produced by the fluid dispensing control unit 50 to the atmosphere, so that there is a heat transferring connection between the enclosure and the atmosphere. Last but not least the front side of the upper shell 17 has a product overlay, being e.g. a thin plastic plate or lamination which holds ornaments, textual information and/or originator branding.

Figure 3:
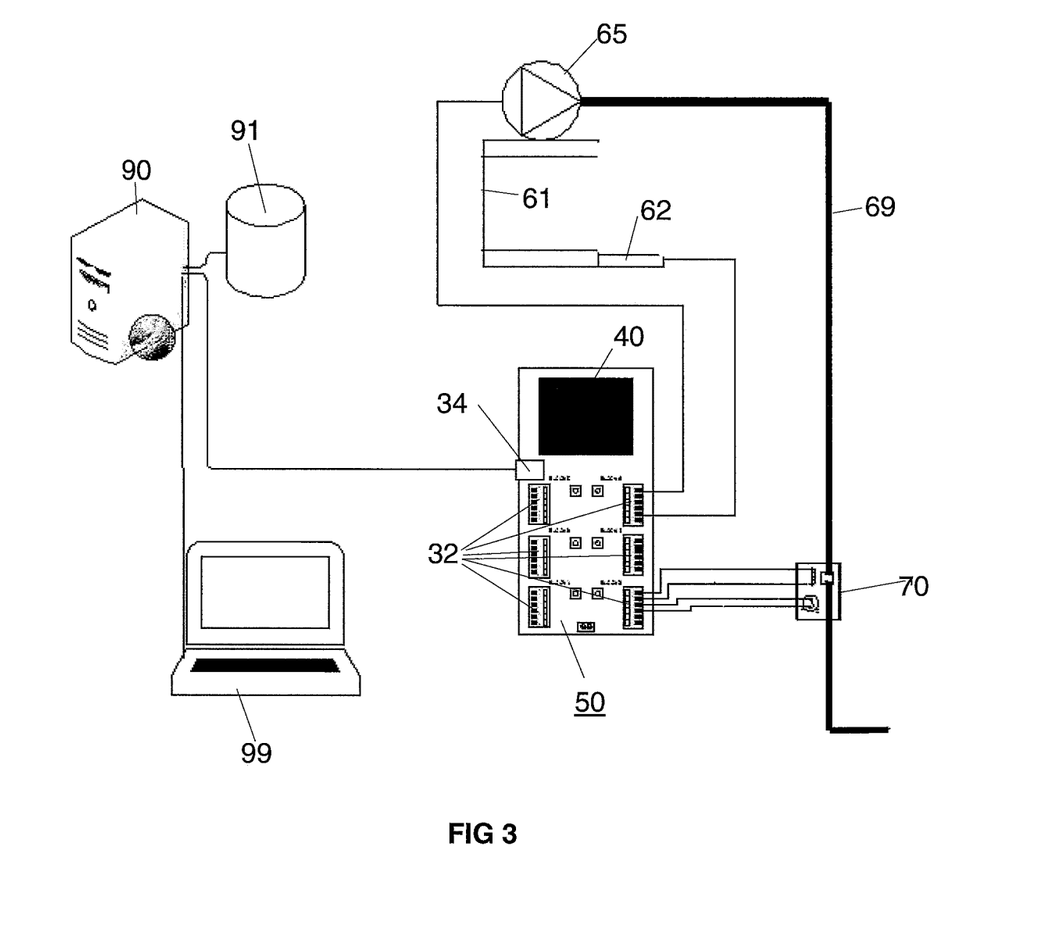
FIG. 3 shows a schematic overview how the fluid dispensing control unit of the FIGS. 1 and 2 can be integrated in a fluid dispensing system for a single site arrangement.

FIG. 3 shows a schematic overview how the fluid dispensing control unit 50 of the FIGS. 1 and 2 can be integrated in a fluid dispensing system. One of the general purpose input output ports 32 of the fluid dispensing control unit 50 is connected to an oil pump 65 to control this pump 65 and to an oil tank level sensor 62 of an oil tank 61, so that e.g. a low oil level in the oil tank 61 can be detected and reported to initiate appropriate refill. Thereby the oil pump 65 pumps on demand oil from the oil tank 61 to a point of demand via the oil line 69.

The flow of oil to the point of demand is controlled by a so-called combo unit 70, which has a solenoid valve for allowing and shutting off the oil flow and also a meter for detecting the exact amount of oil which has been dispensed to said point of demand, which can be a car in a garage requiring a refill of the motor oil due to a service inspection. The solenoid valve and the meter of the combo unit 70 are connected to another one of the general purpose input output ports 32 of the fluid dispensing control unit 50 for opening and closing the valve and to receive the metered amount of dispensed oil from the meter. Further also separate and specialized metering device on the oil dispensing hose can be connected.

The fluid dispensing control unit 50 can control multiple pumps 65 and dispense points respectively combo units 70 and monitor multiple tanks 61. It is basically six sets of generic purpose input outputs ports 32 that can be configured to do any of these tasks.

Via the Ethernet connection port 34 the fluid dispensing control unit 50 is connected via the web, e.g. via the World Wide Web or internal intranet network with an enterprise software web server 90, which is closely connected with an enterprise software database 91. Via the web in principle every web qualified PC 99 with an internet browser can connect to the enterprise software web server 90, of course only if corresponding access is granted according to an access right management system, authorization and firewalls. For example this PC 99 can be located at an operator of a vehicle service shop, so that the operator can control and monitor via this arrangement in principle from everywhere where a web connection is available, the fluid dispensing system in his shop, e.g. for billing and control purposes.

The centralized enterprise software can be accessed by the end users via the web browser by any PC 99 on the network without loading additional software. This constitutes a great advantage as no special software has to be installed on the PC 99, a web browser is sufficient. Previously each computer that was to be used to access and control the system required a software installation of its own.

As the system function is to measure and record e.g. oil distribution for vehicle service shops, the enterprise software is used to initiate an oil dispense transaction on the fluid dispensing control unit 50, which turns the combo unit oil valve on and measures the volume of oil moving through by monitoring the dispense unit metering switch. When the service technician is done filling the vehicle with oil the fluid dispensing control unit 50 turns the valve off and reports the details of the dispense back to the web server 90 where a record is made in the database 91. There are many features and tools within the software to allow complete control and tracking of the fluids being dispensed through the system.

Each individual fluid dispensing control unit 50 has a web server embedded into it and thus allows for modifications to system settings and diagnostic information by directly accessing it via a PC web browser that is on the network. The previous solutions required a software installation to mediate any programming. Now this can also be done from the on-board LCD touch screen 40. Thereby the fluid dispensing control unit 50 has a DHCP (Dynamic Host Configuration Protocol) capability. DHCP allows a computer to request an IP address from the existing computer network and is a major security feature for computer networks. The enterprise software allows real-time monitoring of the dispensing volume via the PC client web browser.

An automatic override feature allows for the automatic continued use and recording of fluid dispensing in the case that the network communication fails. Currently a site must manually instruct each individual controller to move back and forth between override and regular operating mode. Override is a controller state where all outputs are in the "ON" state, thus allowing dispensing of fluids without the required permissions of the regular operating mode. This is designed to allow the vehicle service shop to continue to operate in the event of a network outage.

FIG. 3 shows for explanation purposes only one fluid dispensing control unit 50 with one dispense point, but this is of course not limiting. There can be more fluid dispensing control units 50 and several different fluid dispense points and/or fluid tanks in one site, which all can be connected and linked in the described manner. Also there is no specific requirement how to connect the devices as long as a web connection is available, what is also valid for the installation of the fluid dispensing control unit 50 in the service shop and its connection e.g. to the combo unit 70 and/or the oil pump 65.

Such fluid dispensing control units 50 can sit anywhere on a customer's existing computer network and be organized by one software installation that controls them in custom groups known as sites, whereby a multiple sites arrangement is explained in more detail in the following together with FIG. 4. Previously each individual site required a separate installation and separate network. With the described system configuration also multiple sites of one and the same operator can be supervised, controlled and monitored. As an example FIG. 4 shows such an arrangement with multiple sites 101, 102 to 10#, which are all connected with the enterprise software web server 90.

Figure 4:
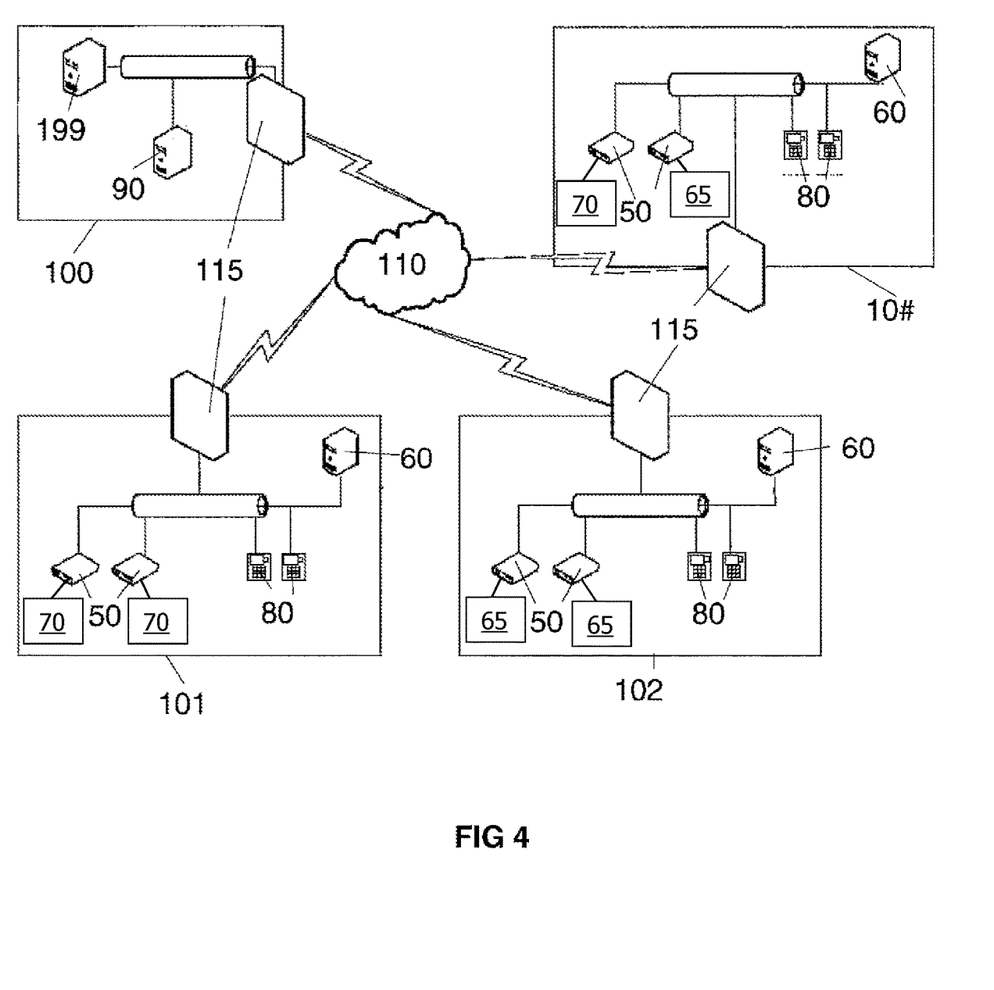
FIG. 4 shows an arrangement with multiple sites.

In FIG. 4 each site 101, 102 to 10# has a number of fluid dispensing control units 50, a number of keypads 80 e.g. for steering the fluid dispensing control units 50 and a tank monitor 60, whereby the fluid dispensing control units 50, the keypads 80 and the tank monitor 60 at each of the sites 101, 102 to 10# are connected among each other forming a local network. Thereby particularly the fluid dispensing control units 50, the tank monitors 60, and keypads 80 are preferably connected via a wire connection but can be connected via a wireless connection e.g. a wifi with a corresponding wifi router. The network of each of the sites 101, 102 to 10# is connected via a firewall 115 via a private circuit 110 and another firewall 115 to the enterprise software server site 100 with the enterprise software web server 90. Thereby at the enterprise software server site 100 the enterprise software web server 90 can be connected with a dealer management server 199 for enhanced intercommunication e.g. of an enterprise resource planning program of the dealer on the dealer management server 199 and the enterprise software on the enterprise software web server 90.

So similar as connecting with the PC 99 in FIG. 3 to the network configuration, the user can also connect in FIG. 4 to access each of the sites 101, 102 to 10# and/or to get a conglomerated overview of all or a selected number of the sites 101, 102 to 10#. The end user can have login credentials that work across multiple different sites. This is beneficial as users can change work roles when switching between sites thus increasing or decreasing their access within the system accordingly. Previously each individual site system would have to setup user credentials for each person using the system.

Figure 5:
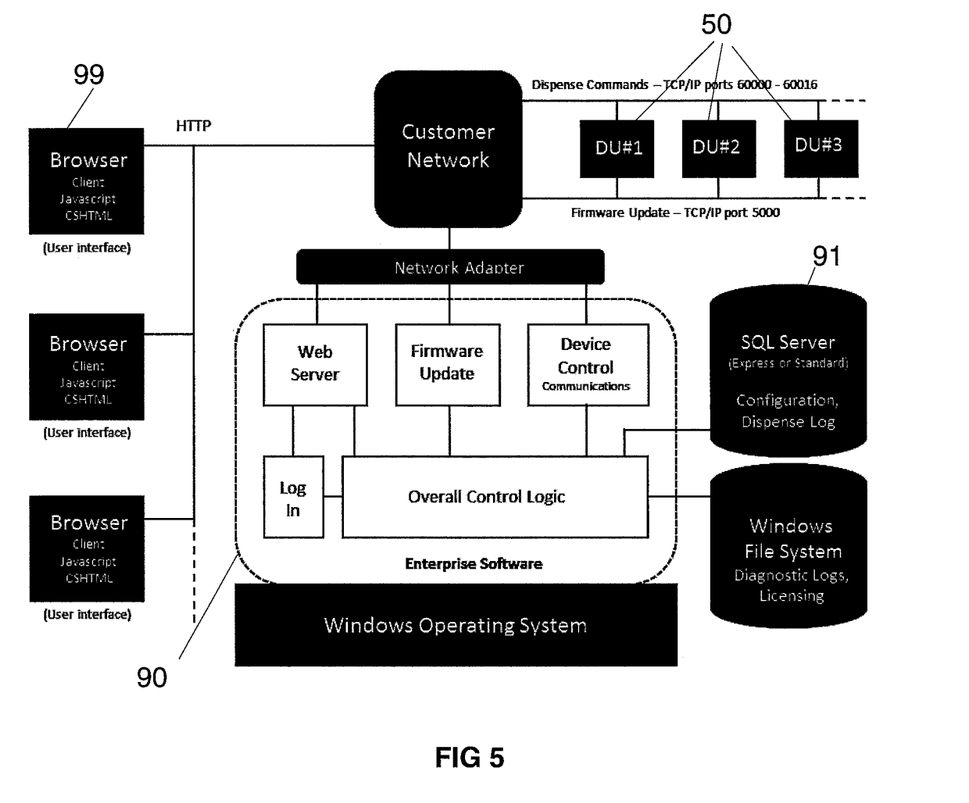
FIG. 5 shows a similar arrangement as in FIG. 4, whereby particularly the enterprise software installation on an enterprise software web server is illustrated in further detail.

FIG. 5 shows a similar network arrangement as in FIG. 4, whereby particularly the enterprise software installation on the enterprise software web server 90 is more detailed out. Thereby the enterprise software is structured in following five main software parts: A web server software part, a firmware software part, a device control communications part, a log in part and an overall control logic part. The enterprise software database can be a separate SQL server or an integral part of the enterprise software web server 90.

Further details of the enterprise software and their physical installation requirements are outlined in the following: The enterprise software requires a central enterprise software web server 90. This central server 90 manages the fluid dispensing control units 50 for multi-site locations and usually operates as a Windows service. It manages fluid dispensing control units 50, keypads 80, and client applications connected at each site. The central server 90 stores and synchronizes all site configurations and transactional data via the SQL server that is on the same machine or is remote machine. It operates over large scale intranets using Windows Server 2008, Windows Server 2012, Windows 7, Windows 8, or Windows 10 as the base operating system.

The enterprise software web server 90 can be a Windows server 2008 R2 or above. It can be a dedicated or virtualized server. It should have Internet Information Services (IIS) version 7.5 or above and NET version 4.5.2 or above. It should have 6-8 GB real or virtual RAM particularly if a multiple site arrangement has to be supported. It shall have 2-4 real or virtual CPUs, 2 ports open an intranet website of the enterprise software provider (80/81 for the web client, plus either 8080/8081 for non SSL or 8443/8444 for SSL, for the web API). The enterprise software web server 90 shall incorporate or be connected with a SQL Server 2008 R2 or above, or SQL Express 2012 or above, or SQL Standard 2012 or above. Thereby a specific SQL instance name shall be provided for the enterprise software provider. Fluid dispensing control units 50 then communicate via TCP/IP and appear as TCP/IP servers at default TCP ports 60001-60006 and 60011-60016 (or customer selected TCP ports N01-N06 and N11-N16 for your choice of TCP port base N). Thus for port forwarding, 12 remote TCP ports per fluid dispensing control unit 50 are required.

On the client side usually existing PC 99 or laptop is required. Thereby client application is used to dispense, view transactions, print reports and make local configuration changes. Fifty client applications can be connected per site. The application is accessed through a web browser that communicates to the enterprise software on the central server 90. The user accesses the application through an IE browser 11 or later or Chrome with a known address for that specific site. Each site can only access their site information. The user would need to enter in their user name and password to grant them access to what they are allowed. The PC 99 or laptop should have Windows 7 or above. Further Adobe Flash Player should be available.

The software allows a maximum number of fifty keypads 80 per site to be connected to the central server 90. The keypad 80 connects through the site's existing network or the enterprise software provider network and communicates to the central server software. The keypads 80 are setup with a static IP address, subnet and gateway. The keypad 80 initiate dispenses to any hose at that site.

Regarding fluid dispensing control units 50 the maximum number is also fifty per site. Also the fluid dispensing control unit 50 connects through the site's existing network or the software provider network and communicates to the central server software. The fluid dispensing control units 50 are setup with dynamic IP address. The fluid dispensing control unit 50 controls up to six reels respectively dispense points per fluid dispensing unit 50 for a total of three hundred dispense points.

The enterprise software has a two parts configuration hierarchy, being a system level and a site level. On the system level the sites, users, fluids and fluid tanks are added and administered. On the site level transaction views are provided, the site configuration can be changed, reports can be run, users can be changed or added, it can be switched to a different site, if that user has corresponding authorization, and dispense related matter can be managed.

The enterprise software enables to setup for example of up to fifty sites. A site can be deactivated by keeping its history. Two sites can be setup at the same physical location, if different parts of the shop shall have different behavior, e.g. a main shop and a fuel/lube island. An unlimited number of users can be setup. Users can be assigned to different sites with different roles. A user can be default to a specific site, so that this user will always be directed to that site when this user logs in. A user can be deactivated e.g. once the user is no longer with the company.

System administrator, site administrator, manager and mechanic are available user types. Usually one system administrator may be setup per system. The system administrator is in charge of all the system level configurations like sites, fluids, fluid tanks and high level users like site administrators and maybe managers. The system administrator can run reports for all sites and has full rights for everything around the fluid dispense for all sites. A site administrator can setup site specific information as well as mechanic and manager users. The site administrator can run reports for site(s) she/he is assigned to. The site administrator has full rights for everything around the fluid dispense for the site(s) she/he is assigned to. A manager can run reports for sites she/he is assigned to, administer mechanics and change fluid tank levels. The manager has full rights for everything around the fluid dispense for the site(s) she/he is assigned to. Last but not least the mechanic only has certain rights around the dispense. The software allows differentiating in users: Users can be assigned to different sites and different levels. Depending on the access at the site level, the user would see different icons to select. Assigned site(s) can be changed by a dropdown.

Fluids are setup on the system level configuration since multiple sites within the same group usually use the same fluid. This allows e.g. a manager to run a report from multiple sites on a fluid independent of what they call it at a specific site. Thereby the software offers a so-called specific gravity field in case a tank monitor system exists.

The software enables various configurations for fluid tanks. Tanks are configurable on the system level as a tank can be shared amongst two sites (e.g. one building that shares a GM and VW dealership that has different part numbers for the same fluid and shares the pump/tank). The size, name, unit of measurement, type of dispensing mode, and new/used fluid can be set and a fluid can be assigned to it.

The site configuration allows setting of general preferences for the site, like imperial or metric and decimal precision. The site configuration also allows dispense related changes, for example enabling miscellaneous heading like repair order # and job # and change the order of screen view, but also change pre-dispense, post-dispense and free dispense timeouts. At the site level the configuration enables hardware settings as adding dispense units and keypads, but also internet protocol related changes and subnet settings. At the site level the tanks can be configured regarding change of fluids, fluid level, part number, air valve and warning levels for tanks. At the site level hoses can be configured regarding hose number, tank number, port for pulse meter/solenoid, unit of measurement, piston pump unit, maximum dispense and mode of operation.

Reports can be created by dispenses, users and tank levels. Thereby reports can be filtered by date, sites, users, hoses, tanks and fluids.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A fluid dispensing control unit comprising:
   an enclosure,
   at least one electronic circuitry processor housed within the enclosure and configured to function as a web server,
   at least one fluid dispensing device signal port housed within the enclosure and configured to connect to a fluid dispensing system device being a fluid valve, a meter, or a pump for controlling or metering dispensed fluid or for controlling the pump and/or the fluid valve, and
   at least one web signal port housed within the enclosure and configured to connect the web server to a web enabling remote control of the fluid dispensing control unit and the connected fluid dispensing system device via the web,
   wherein the at least one fluid dispensing device signal port and the one web signal port are connected together with the at least one electronic circuitry processor;
   wherein the at least one electronic circuitry processor is configured so that in the event that remote control of the fluid dispensing control unit via the web is not possible an automatic override function allows continued operation of the connected fluid dispensing system device locally via the fluid dispensing control unit.

2. The fluid dispensing control unit according to claim 1, wherein the web server, the electronic circuitry processor is configured to function as, is for the at least one fluid dispensing device signal port for separately addressing the connected fluid dispensing system devices via the web.

3. The fluid dispensing control unit according to claim 2, wherein the at least one fluid dispensing device signal port includes a plurality of fluid dispensing device signal ports connected to the at least one electronic circuitry processor, each fluid dispensing device signal port configured to connect to fluid dispensing system devices being a fluid valve, a meter, or a pump for controlling or metering the dispensed fluid or for controlling the pump and/or fluid valve, and wherein the at least one electronic circuitry processor is configured to form a separate web server for each of the fluid dispensing device signal ports for separately addressing the connected fluid dispensing system devices via the web.

4. The fluid dispensing control unit according to claim 1, further comprising an LCD touch screen being connected to the electronic circuitry processor.

5. The fluid dispensing control unit according to claim 1, further comprising an EEPROM for storing data that must be retained through electrical supply power cycles.

6. The fluid dispensing control unit according to claim 1, wherein the at least one web signal port includes an Ethernet connector.

7. The fluid dispensing control unit according to claim 1, further comprising a printed circuit board supporting and connecting all electronic elements of the fluid dispensing control unit, including the at least one electronic circuitry processor and the at least one fluid dispensing device signal port.

8. The fluid dispensing control unit according to claim 1, wherein the enclosure includes at least two matching parts configured to be openable and closeable.

9. The fluid dispensing control unit according to claim 1, wherein the web is the World Wide Web.

10. The fluid dispensing control unit according to claim 1, wherein the web is a private intranet.

11. The fluid dispensing control unit of claim 1, in combination with the fluid dispensing system device, the fluid dispensing system device spaced apart from the fluid dispensing control unit and communicatively coupled to the fluid dispensing control unit via the at least one fluid dispensing device signal port for the exchange of communication signals between the fluid dispensing control unit and the fluid dispensing system device.

12. The fluid dispensing control unit according to claim 1, wherein the at least one fluid dispensing device signal port includes a plurality of fluid dispensing device signal ports connected to the at least one electronic circuitry processor, each fluid dispensing device signal port configured to connect to fluid dispensing system devices being a fluid valve, a meter, or a pump for controlling or metering the dispensed fluid or for controlling the pump and/or fluid valve, and
   wherein the web server, the electronic circuitry processor is configured to function as, is for the plurality of fluid dispensing device signal ports for separately addressing the connected fluid dispensing system devices via the web.

13. A fluid dispensing system central web server software installation that enables communication between a central web server and at least one fluid dispensing control unit via a web, and a computer connected to the web, the fluid dispensing system central web server software installation comprising:
   the at least one fluid dispensing control unit including:
      an enclosure, at least one processor housed within the enclosure and configured to function as a web server, at least one fluid dispensing device signal port being connected to the processor and configured to connect to a fluid dispensing system device being a fluid valve, meter, or pump for controlling or metering dispensed fluid or for controlling the pump and/or the fluid valve, and at least one web signal port being connected to the processor, the at least one web signal port being housed within the enclosure and configured to connect the web server to the central web server via the web enabling remote control of the fluid dispensing control unit and the connected fluid dispensing system device via the web, and the computer configured to control and monitor the connected fluid dispensing system device via the at least one fluid dispensing control unit without having any specific software installed on the computer aside from a web browser accessing the central web server;

wherein the at least one processor is configured so that in the event that remote control of the at least one fluid dispensing control unit via the web is not possible an automatic override function allows continued operation of the connected fluid dispensing system device locally via said at least one fluid dispensing control unit.

14. The fluid dispensing system central web server software installation according to claim 13, wherein the installation enables the connection of the central web server via the web with at least two groups of fluid dispensing control units, and wherein each of the two groups comprises at least one fluid dispensing control unit and at least one connected fluid dispensing system device.

15. The fluid dispensing system central web server software installation according to claim 14, wherein each of the two groups reflects a physical site being physically distanced from each other.

16. The fluid dispensing system central web server software installation according to claim 14, wherein the two groups are at the same physical location.

17. The fluid dispensing system central web server software installation according to claim 14, wherein the installation enables assigning users to different groups with the same or different roles dependent of the assigned groups.

18. The fluid dispensing system central web server software installation according to claim 14, wherein the installation enables a two tiered configuration hierarchy, one level on the groups and a system level above the groups.

19. The fluid dispensing system central web server software installation according to claim 18, wherein the installation enables assigning users to the different levels.

20. The fluid dispensing system central web server software installation according to claim 13, wherein the installation comprises an interface to an enterprise resource planning system.

* * * * *